(12) United States Patent
Zumsteg et al.

(10) Patent No.: US 7,630,390 B2
(45) Date of Patent: Dec. 8, 2009

(54) ASYNCHRONOUS HUB

(75) Inventors: Philip J. Zumsteg, Shorewood, MN (US); Kevin R. Driscoll, Maple Grove, MN (US); Brendan Hall, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 748 days.

(21) Appl. No.: 10/993,911

(22) Filed: Nov. 19, 2004

(65) Prior Publication Data

US 2005/0135404 A1 Jun. 23, 2005

Related U.S. Application Data

(60) Provisional application No. 60/523,782, filed on Nov. 19, 2003, provisional application No. 60/523,900, filed on Nov. 19, 2003, provisional application No. 60/560,323, filed on Apr. 6, 2004, provisional application No. 60/523,785, filed on Nov. 19, 2003.

(51) Int. Cl.
*H04L 12/28* (2006.01)
*H04B 7/212* (2006.01)
*H04L 12/413* (2006.01)
*H04L 12/43* (2006.01)
*H04J 3/02* (2006.01)

(52) U.S. Cl. .............. 370/425; 370/444; 370/447; 370/461; 370/462

(58) Field of Classification Search ............. 370/229, 370/230, 235, 240, 314, 321, 336, 347, 348, 370/395.21, 395.4, 395.42, 425, 442, 443, 370/444, 447, 458, 461, 462
See application file for complete search history.

(56) References Cited

U.S. PATENT DOCUMENTS

| | | | | |
|---|---|---|---|---|
| 3,943,296 A | * | 3/1976 | O'Neill | 370/201 |
| 4,593,282 A | | 6/1986 | Acampora et al. | |
| 4,998,247 A | * | 3/1991 | Irvine-Halliday et al. | 370/407 |
| 5,107,492 A | | 4/1992 | Roux et al. | |
| 5,343,474 A | | 8/1994 | Driscoll | |
| 5,784,374 A | * | 7/1998 | Runaldue | 370/414 |
| 6,396,832 B1 | * | 5/2002 | Kranzler | 370/360 |
| 6,940,808 B1 | * | 9/2005 | Shields et al. | 370/216 |
| 2003/0135682 A1 | * | 7/2003 | Fanning | 710/305 |
| 2004/0081193 A1 | * | 4/2004 | Forest et al. | 370/458 |

FOREIGN PATENT DOCUMENTS

| | | |
|---|---|---|
| EP | 0 383 475 A2 | 8/1990 |
| EP | 0 491 202 A2 | 6/1992 |
| GB | 2 236 606 A | 4/1991 |
| GB | 2 250 161 A | 5/1992 |
| WO | WO 01/13230 A1 | 2/2001 |

* cited by examiner

*Primary Examiner*—Seema S Rao
*Assistant Examiner*—Christine Duong
(74) *Attorney, Agent, or Firm*—Fogg & Powers LLC

(57) ABSTRACT

A method for arbitrating access to a time slot in a time division multiple access network in an asynchronous hub with a bus guardian is provided. The method including receiving signals from competing nodes claiming access to the same time slot at the bus guardian of the asynchronous hub, selecting one of the nodes based on a priority scheme, and relaying a message from the selected node and blocking the message from the non-selected node.

16 Claims, 4 Drawing Sheets

ASYNCHRONOUS HUB

CROSS REFERENCE TO RELATED APPLICATIONS

This application is related to and claims the benefit of the filing date of the following U.S. Provisional Applications:

Ser. No. 60/523,782, entitled "HUB WITH INDEPENDENT TIME SYNCHRONIZATION" filed on Nov. 19, 2003, Ser. No. 60/523,900, entitled "COMMUNICATION FAULT CONTAINMENT VIA INDIRECT DETECTION," filed on Nov. 19, 2003, (the '900 Application)

Ser. No. 60/560,323 entitled MESSAGE AUTHENTICATION IN A COMMUNICATION NETWORK and filed on Apr. 6, 2004 (the '323 application)

Ser. No. 60/523,785, entitled "PRIORITY BASED ARBITRATION FOR TDMA SCHEDULE ENFORCEMENT IN A DUAL CHANNEL SYSTEM" filed on Nov. 19, 2003 (the '785 application).

These provisional applications are incorporated herein by reference.

This application is also related to the following co-pending, non-provisional applications:

U.S. patent application Ser. No. 10/993,916, entitled "COMMUNICATION FAULT CONTAINMENT VIA INDIRECT DETECTION," filed on even date herewith (the '947 Application).

U.S. patent application Ser. No. 10/993,164, entitled "PORT DRIVEN AUTHENTICATION IN A NETWORK" filed on even date herewith (the '587 Application).

U.S. patent application Ser. No. 10/993,926, entitled "PRIORITY BASED ARBITRATION FOR TDMA SCHEDULE ENFORCEMENT IN A MULTI-CHANNEL SYSTEM" filed on even date herewith (the '459 application).

These non-provisional applications are incorporated herein by reference.

BACKGROUND

Communication networks are used in a variety of applications including telephone and computer systems, weapons systems, navigational systems, and advanced control systems in cars, aircraft and other complex systems. Given the variety of applications, many kinds of communications networks have been developed over the years. One common characteristic of communication networks is the use of a communication medium that interconnects various nodes on the network. Various topologies and protocols have been developed to control communications between the nodes of these networks.

One type of network is referred to as Time Division Multiple Access (TDMA). In a TDMA network, nodes in the network are assigned time slots for communicating over the network. Many different TDMA protocols have been developed for communication between nodes of a network. For example, these protocols include TTP/C, SAFEbus, FlexRay and other TDMA protocols.

In many time-triggered protocols, a global clock synchronization protocol is used to maintain synchronization between the clocks at each of the nodes. This synchronization of the local clocks assures that the nodes have the same time basis for determining the beginning of each time slot. Each node monitors the transmission on the network and independently synchronizes its clock to the global clock of the network based on the timing of the receipt of selected signals from the other nodes, e.g., an action time signal in the TTP/C Specification.

One problem with existing time-triggered protocols with global time synchronization is that faults that propagate in the network may adversely affect the time synchronization of nodes in the network. When a node transmits out of turn, if the frame or message is allowed to reach other nodes in the system, then the global synchronization may be adversely impacted.

Therefore, a need exists for an improved mechanism for reducing the impact of faults on a global time synchronization in a network implementing a time-triggered protocol.

SUMMARY

Embodiments of the present invention provide an asynchronous bus guardian for a time division multiple access (TDMA) network. The guardian implements an arbitration technique to select between nodes that claim access to the same time slot to mitigate the propagation of faults in the network.

In one embodiment, a method for arbitrating access to a time slot in a time division multiple access network in an asynchronous hub with a bus guardian is provided. The method including receiving signals from competing nodes claiming access to the same time slot at the bus guardian of the asynchronous hub, selecting one of the nodes based on a priority scheme, and relaying a message from the selected node and blocking the message from the non-selected node.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide a network with an asynchronous hub. In this network, a fault occurs, for example, when a node attempts to transmit during a timeslot assigned to another node. When the fault occurs, a bus guardian in the asynchronous hub uses an arbitration technique to assure that the message from the node assigned to the time slot is transmitted from the hub to its destination. Advantageously, this technique uses indirect detection to detect the fault with the attempt to transmit during the wrong time slot. The indirect detection aspect of the invention is described in more detail in the '916 and '900 Applications incorporated by reference above.

Figure 1:
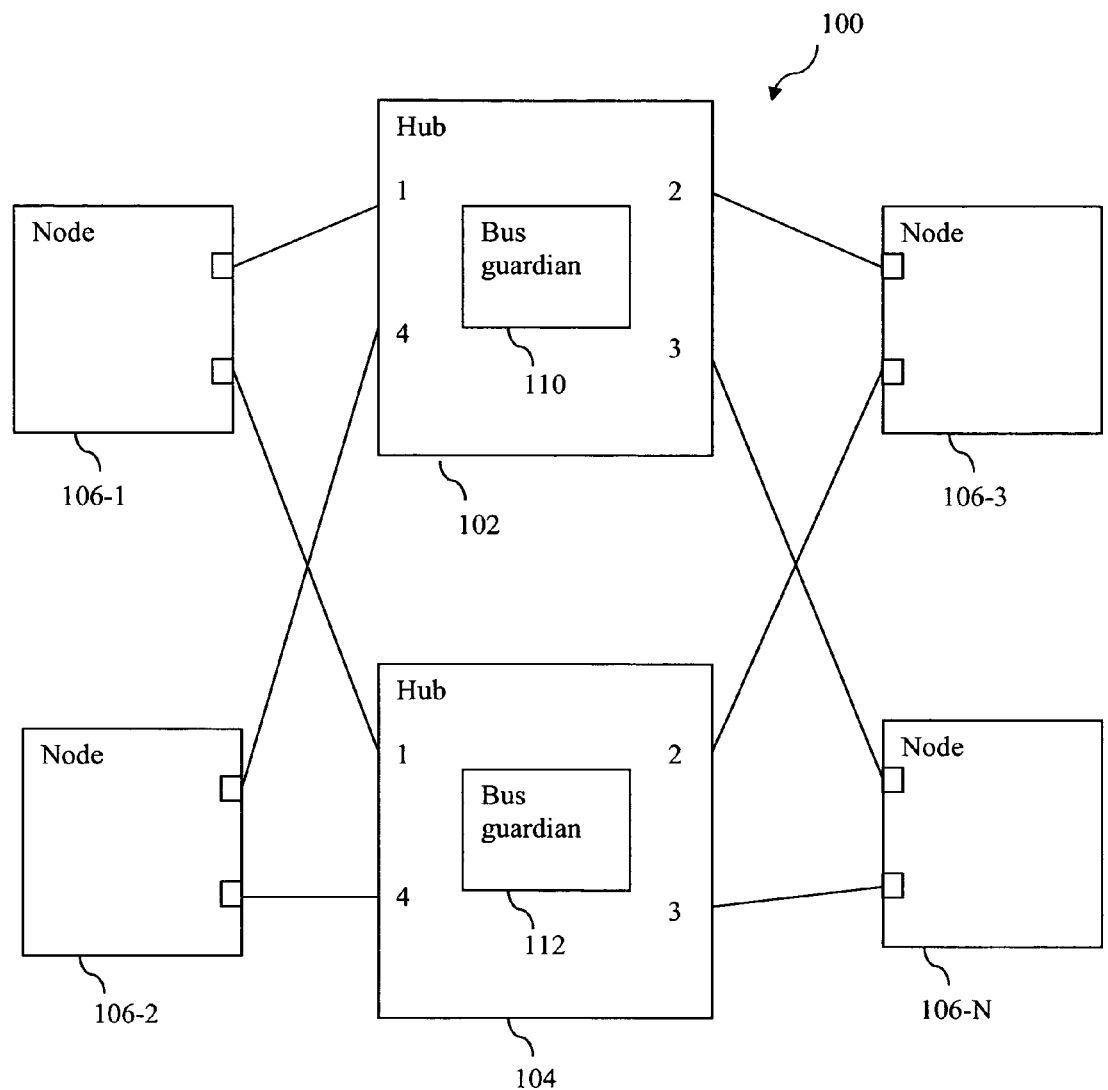
FIG. 1 is a block diagram of one embodiment of a star network that implements a distributed, time-triggered protocol with a hub that operates with independent time synchronization.

FIG. 1 is one embodiment of a network indicated generally at 100. Network 100 includes asynchronous hubs 102 and 104 connected in a star configuration with nodes 106-1 to 106-N. Hubs 102 and 104 are referred to collectively as "the hub" of network 100. In this embodiment, network 100 includes two channels of communication for each node 106-1 to 106-N. Hub 102 provides the first communication channel between the nodes 106-1 to 106-N. Hub 104 provides the second communication channel between the nodes 106-1 to 106-N. Data is transmitted as messages, e.g., frames, from one node to another in the network 100. Each node transmits each frame to both of hubs 102 and 104. Hubs 102 and 104 then selectively transmit the frames to the other nodes to provide 1:N communication for each node. Hubs 102 and 104 are asynchronous in that the hubs are not synchronized with the time base of the nodes 106-1 to 106-N.

In one embodiment, the network 100 implements a distributed, time-triggered communication protocol. For example, in one embodiment, the time-triggered protocol TTP/C described in the TTP specification Edition 1.0.0 of Jul. 4, 2002 issued by TTTech is used (the TTP/C Standard). In this protocol, each node 106-1 to 106-N maintains synchronization with a virtual clock. In other embodiments, the nodes maintain time synchronization using other techniques.

The nodes 106-1 to 106-N are assigned time slots to use for transmission. In one embodiment, the nodes 106-1 to 106-N transmit a signal "Clear To Send" (CTS) to the hubs 102 and 104 prior to the node's assigned time slot. This alerts the hub to expect data from the node. In one embodiment, the CTS signal is sent over the same communication medium as other messages exchanged between the node and the hub. In other embodiments, the CTS signal is sent over a different communication medium.

Hubs 102 and 104 include bus guardians 110 and 112, respectively. Bus guardians 110 and 112 perform an arbitration function for hubs 102 and 104 to deal with competing claims to the same time slot. In one embodiment, guardians 110 and 112 use priority schemes to select among the competing claims to a common time slot. In one embodiment, the guardians 110 and 112 implement complementary priority schemes so that the message from each competing node is relayed by at least one of the hubs 102 and 104.

In operation, hubs 102 and 104 assure that frames of data transmitted from one node to another arrive at the proper destination despite faults that occur in the network from time to time. Each node 106-1 to 106-N is assigned a time slot to transmit frames in the network 100. When a node 106-1 to 106-N transmits a frame, the hubs 102 and 104 forward the frame to the other nodes on the network 100. The intended destination node receives the frame as do all other nodes on the network 100. The destination node processes the frame by determining, based on, e.g., a destination address in the frame, that the frame is destined for the node.

In the course of processing data, a fault may occur in that two of nodes 106-1 to 106-N may attempt to transmit during the same time slot. Each node that intends to transmit during a time slot sends out a CTS signal to each of hubs 102 and 104. In the event that a hub, e.g., hub 102, receives CTS signals from two nodes for the same time slot, the hubs 102 and 104 implement a procedure to assure that the frame from the proper node is transmitted to the other nodes by the hubs 102 and 104. In one embodiment, the two hubs 102 and 104 implement different priority schemes to assure that the proper message is relayed by the hubs to the other nodes. In one embodiment, the two hubs 102 and 104 use complementary priority schemes. Complementary priority schemes result in one of the two frames being transmitted by one hub and the other of the two frames being sent by the other hub. In this embodiment, the correct message is received by the destination node because each node 106-1 to 106-N receives both messages. The nodes 106-1 to 106-N are able to verify the correct message has been received based on, for example, the transmit order list stored in each node 106-1 to 106-N. Advantageously, with this embodiment, the hubs 102 and 104 do not need to store the list of time slots for each node. An example of this embodiment is described in more detail below with respect to FIG. 3.

Figure 2:
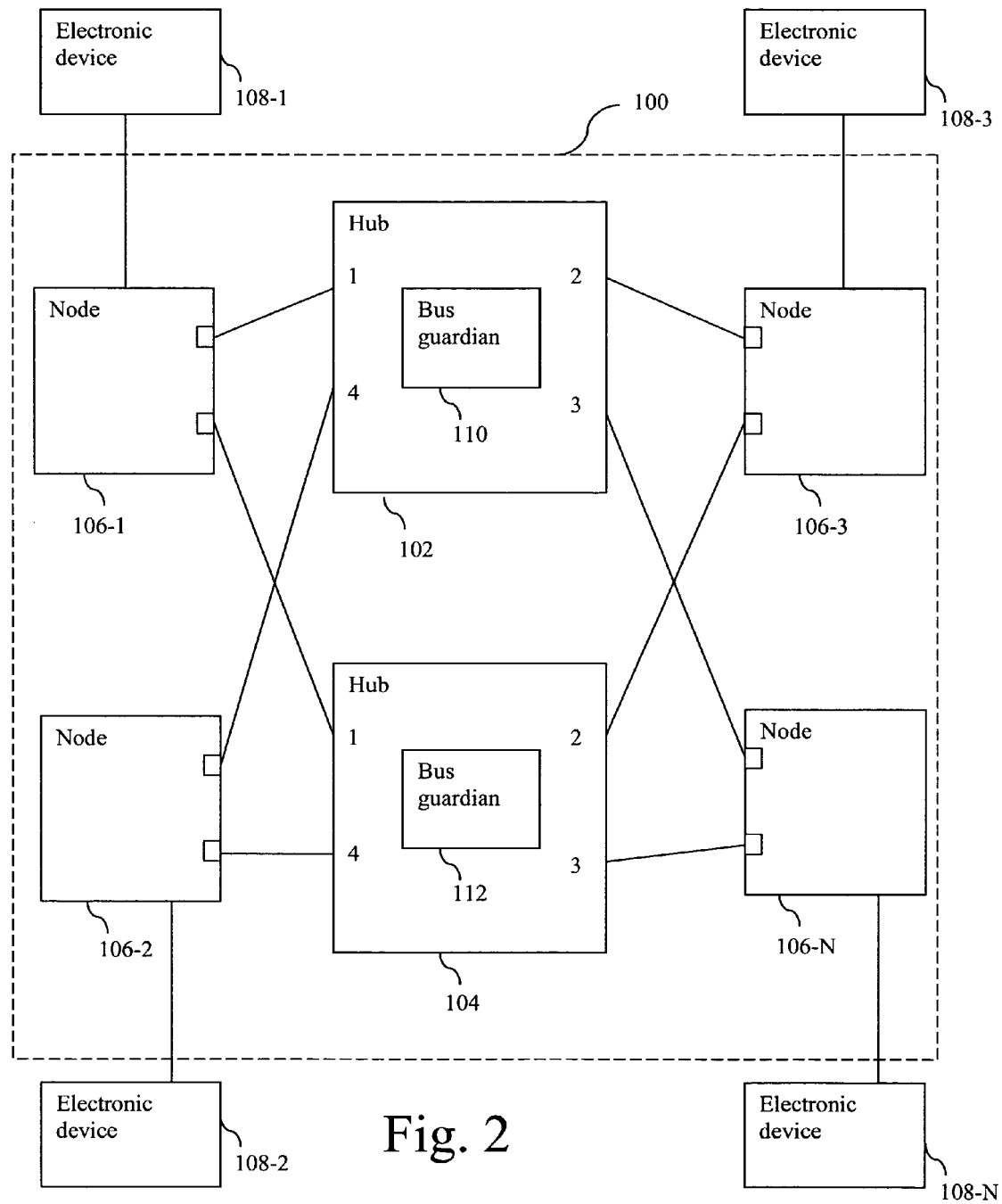
FIG. 2 is a block diagram of another embodiment of a star network in an electronic system.

FIG. 2 is a block diagram of a system indicated at 200 that uses a communication network 100 of the type describe above with respect to FIG. 1. FIG. 2 further shows that the nodes 106-1 to 106-N are connected to a number of electronic devices 108-1 to 108-N, e.g., sensors, processors, actuators, controllers, input devices and the like that communicate messages over the network 100.

Figure 3:
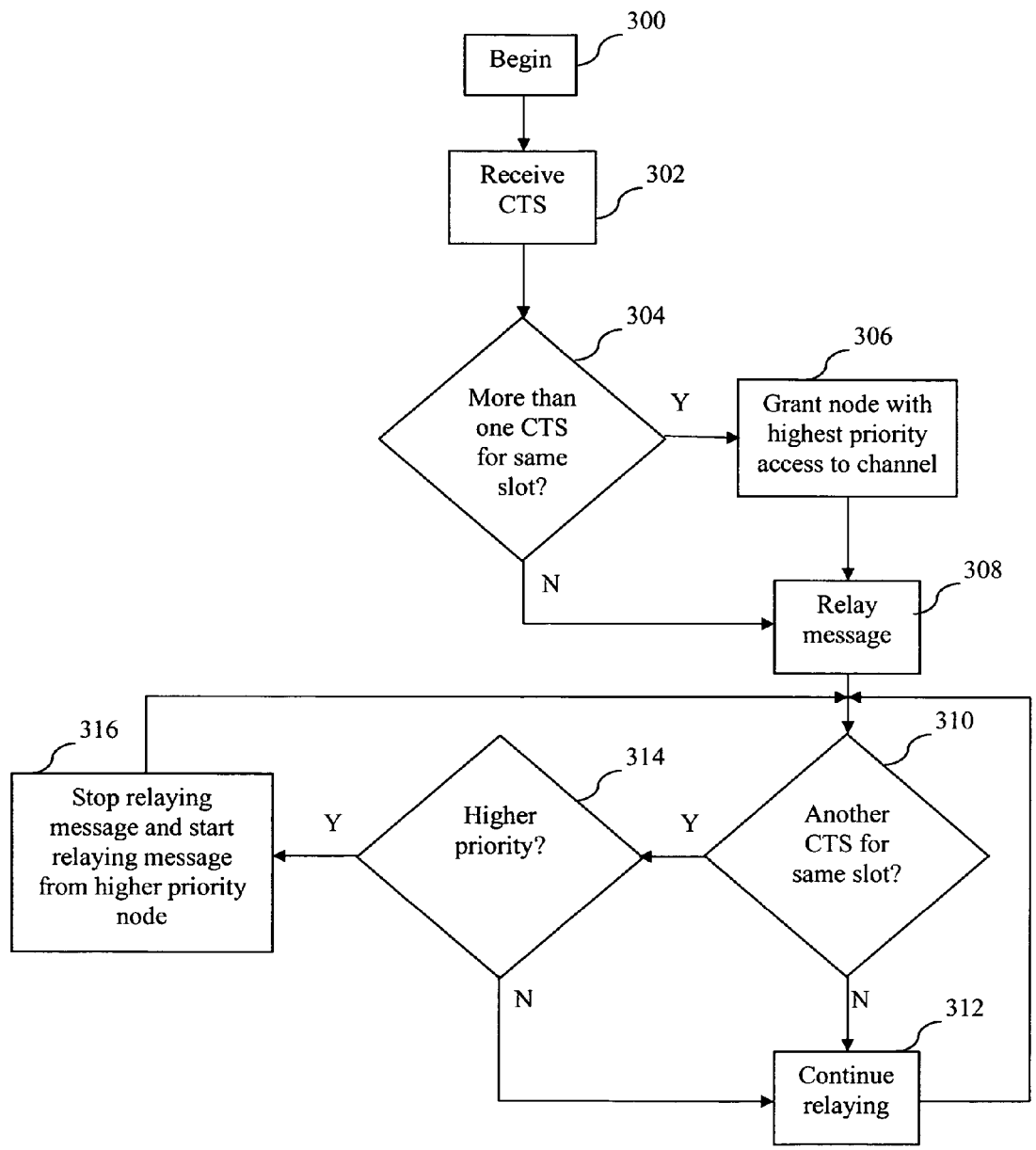
FIG. 3 is a flow chart of one embodiment of a process for a bus guardian in an asynchronous hub for controlling relaying messages from nodes during time slots in a TDMA network.

FIG. 3 is a flow chart of one embodiment of a process for a bus guardian in an asynchronous hub for controlling relaying messages over a communication channel from nodes during time slots in a TDMA network. For purposes of this specification, a channel in a TDMA network includes a communication medium that connects one hub with all of the nodes in the network. Thus, a TDMA network with a star configuration and two hubs is considered a two channel network. The process begins at block 300.

At block 302, the process receives a clear to send (CTS) signal from a node in the network at a bus guardian of an asynchronous hub. The CTS signal indicates that the node that originated the CTS signal claims the next time slot on the channel associated with the hub. The process determines, at block 304, if the guardian has received CTS signals from more than one node for the same time slot on the channel. If so, the process grants the node with the highest priority access to the channel at block 306 and proceeds to block 308. If at block 304 there was no other CTS signal received at the hub, the process proceeds to block 308.

In one embodiment, the priority for a node is based on the port number of the port of the asynchronous hub that received the CTS signal. In one embodiment, a two channel system is used with independent hubs and bus guardians. One bus guardian gives priority to the node with the lowest port number and the other bus guardian gives priority to the node with the highest port number. Thus, when two nodes compete for the same time slot, one node will gain access to the time slot on one channel and the other node will gain access to the time slot on the other channel.

At block 308, the process relays the message from the node that was granted access to the channel.

At block 310, the process determines whether another CTS signal has been received from a different node for the same time slot on the channel. If another CTS signal has not been received, the process continues relaying the message at block 312 and returns to block 310. If, however, the process does receive another CTS signal for the same time slot on the same channel, the process determines whether the node for the additional CTS signal has a higher priority than the node that has been granted access to the channel. At block 314. If not, the process continues relaying the message at block 312. If the process determines that the new CTS signal corresponds to a node with a higher priority, the process stops relaying the current message, inserts a period of silence to ensure that all receiving nodes can reliably detect the start of the next transmission and then relays the message from the higher priority node at block 316. The process returns to block 310.

Figure 4:
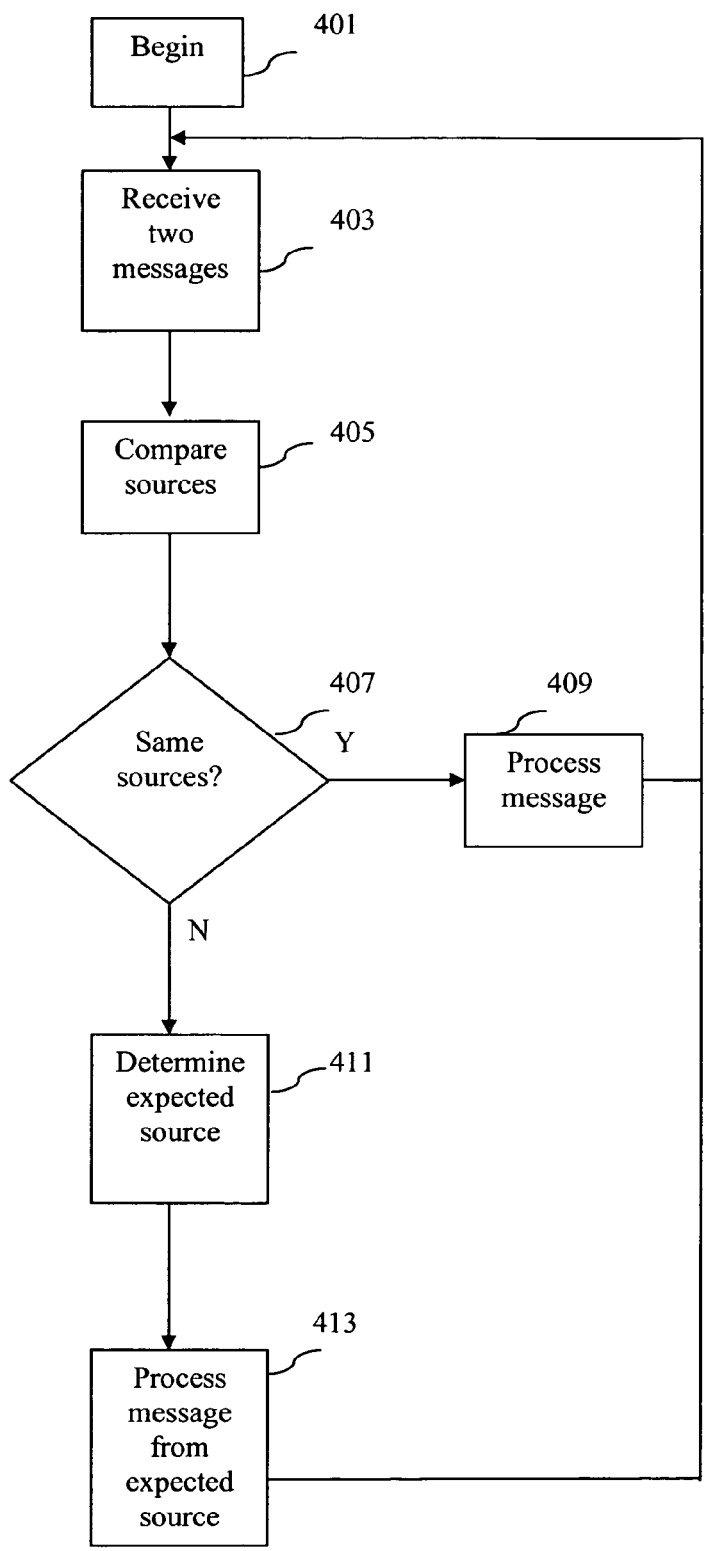
FIG. 4 is a flow chart of one embodiment of a process for a node for determining a proper data frame among different data frames received on different channels in a TDMA network.

FIG. 4 is a flow chart of one embodiment of a process for a node for determining a proper message among different messages received in the same time slot. The process begins at block 401. At block 403, the process receives two messages. At block 405, the process compares the sources of the two messages and determines, at block 407, whether the two messages are from the same source based on, for example, the source address in the messages. In another embodiment, the process uses port driven authentication as described in the '323 and '587 applications to determine the source of the messages. If so, the messages are processed at block 409 and the process returns to block 403. If the two messages are not from the same source, the process determines which of the messages is from the correct source.

At block 411, the process determines the expected source of messages in the current time slot. For example, in one embodiment, the process uses a list of time slots and assigned nodes to determine the expected source and uses port driven authentication to select the proper message between the received messages. At block 413, the process selects the message from the expected source and further processes the message. The process returns to block 403.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions stored on a machine readable medium to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices or machine readable medium suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for arbitrating access to a time slot in a time division multiple access network, the method comprising:
    receiving signals at each of at least two asynchronous hubs from competing nodes claiming access to the same time slot;
    selecting, at each of the at least two asynchronous hubs, one of the nodes based on a priority scheme, wherein each of the at least two asynchronous hubs implements a different, complementary priority scheme such that the node with a higher port number is selected at one of the at least two asynchronous hubs and the node with a lower port number is selected at another of the at least two asynchronous hubs;
    relaying a message from the selected node having the higher port number and blocking the message from the non-selected node having the lower port number at one of the at least two asynchronous hubs; and
    relaying a message from the selected node having the lower port number and blocking the message from the non-selected node having the higher port number at another of the at least two asynchronous hubs.

2. The method of claim 1, and further including inserting a period of silence when each of the at least two asynchronous hubs begins relaying a message from the non-selected node prior to receiving the signal from the selected node.

3. A method for relaying messages at least two hubs from a plurality of nodes, the method comprising:
    receiving a subsequent signal at each of the at least two hubs from a node during relaying of a message from another node, wherein each of the at least two hubs implements a different, complementary priority scheme;
    interrupting relaying of the message at one of the at least two hubs when the node sending the subsequent signal has a higher priority based on a first priority scheme, wherein, based on the first priority scheme, the node sending the subsequent signal has a higher priority when the node sending the subsequent signal has a higher port number than the node sending the message; and
    interrupting relaying of the message at another of the at least two hubs when the node sending the subsequent signal has a higher priority based on a second priority scheme, wherein, based on the second priority scheme, the node sending the subsequent signal has a higher priority when the node sending the subsequent signal has a lower port number than the node sending the message.

4. The method of claim 3, and further including continuing relaying the message when the node sending the subsequent signal has a lower priority.

5. The method of claim 3, wherein receiving a signal comprises receiving a clear to send signal.

6. The method of claim 3, wherein interrupting relaying the message comprises granting access to the node with higher priority.

7. The method of claim 3, wherein interrupting relaying the message includes inserting a silence period before relaying the message from the higher priority node.

8. A network, comprising:
    at least two asynchronous hubs;
    a plurality of nodes coupled to each of the at least two hubs in a star configuration;
    wherein the at least two hubs and the plurality of nodes communicate using time slots in a time-triggered protocol; and
    wherein each of the at least two asynchronous hubs arbitrates between two nodes of the plurality of nodes that claim the same time slot by granting access to a higher priority one of the two competing nodes of the plurality of nodes, wherein each of the at least two hubs implements a different, complementary priority scheme such that one of the at least two asynchronous hubs grants access to the node with a higher port number and another of the at least two asynchronous hubs grants access to the node with a lower port number.

9. A method for relaying messages at least two asynchronous hubs of a time division multiple access network, the network including a plurality of nodes coupled to each of the at least two hubs, the method comprising:
- receiving a signal at each of the at least two hubs from a node claiming access to a time slot;
- determining at each of the at least two hubs whether another node has already claimed access to the time slot;
- when another node has already claimed access to the time slot, granting access to the time slot to the node with a highest priority and relaying a message from the node with the highest priority at each of the at least two hubs based on a different, complementary priority scheme in each of the at least two hubs;
- wherein relaying a message from the node with the highest priority at one of the at least two hubs comprises relaying a message from the node with a higher port number; and
- wherein relaying a message from the node with the highest priority at another of the at least two hubs comprises relaying a message from the node with a lower port number.

10. A method of relaying messages at least two asynchronous hubs in a time division multiple access network, the method comprising:
- receiving a signal at each of the at least two hubs from a first node of the network claiming a next time slot;
- beginning to relay a message from the first node;
- receiving a signal from a second node of the network indicating that the second node is assigned the time slot claimed by the first node;
- determining at each of the at least two hubs whether the second node has a higher priority than the first node based on a different, complementary priority scheme in each of the at least two hubs such that the node with a higher port number has a higher priority at one of the at least two hubs and the node with a lower port number has a higher priority at another of the at least two hubs;
- when the second node has a higher port number, relaying the message from the second node at one of the at least two hubs; and
- when the second node has a lower port number, relaying the message from the second node at another of the at least two hubs.

11. The method of claim 10, and further comprising inserting a period of silence before relaying the message from the second node when the second node has a higher priority.

12. The method of claim 10, wherein receiving a signal comprises receiving a clear to send signal.

13. A method for controlling relaying of messages from a plurality of nodes by at least two asynchronous hubs in a network, the method comprising:
- at each of the plurality of nodes, determining a time slot assigned for that node to transmit a message from that node to another of the plurality of nodes through the at least two hubs;
- activating a signal at each of the plurality of nodes that has identified a next time slot as the assigned time slot for that node to transmit a message from that node to the other nodes of the plurality of nodes through the at least two hubs; and
- when each of the at least two hubs receives a signal from two of the plurality of nodes making a claim to the same time slot, selectively relaying, at each of the at least two hubs, one of the two competing messages from the two nodes to the other nodes of the plurality of nodes in the network based on a different, complementary priority scheme in each of the at least two hubs;
- wherein selectively relaying at least one of the two competing messages comprises;
- passing one of the messages to the other nodes on a first channel based on a first priority scheme; and
- passing the other of the messages to the other nodes on a second channel based on a second priority scheme;
- wherein passing one of the messages based on the first priority scheme comprises selecting the message associated with the node with a higher port number at one of the at least two hubs and passing the other of the messages based on the second priority scheme comprises selecting the message associated with the node with a lower port number at another of the at least two hubs.

14. A method for arbitrating access to a dual medium, the method comprising:
- receiving signals at each of at least two hubs from competing nodes claiming access to at least two media;
- selecting, at each of the at least two hubs, one of the nodes based on a priority scheme, wherein each of the at least two hubs implements a different, complementary priority scheme such that the node with a higher port number is selected at one of the at least two hubs and the node with a lower port number is selected at another of the at least two hubs; and
- relaying a message from the selected node having the higher port number at one of the at least two hubs; and
- relaying a message from the selected node having the lower port number at another of the at least two hubs.

15. The method of claim 14, further comprising:
- receiving a subsequent signal at each of the at least two hubs from another node claiming access to the at least two media;
- determining at each of the at least two hubs whether the other node has a higher priority than the selected node based on a different, complementary priority scheme in each of the at least two hubs;
- when the other node has a higher priority, interrupting the relayed message of the selected node and relaying a message from the other node; and
- when the selected node has a higher priority, continuing to relay the message from the selected node.

16. A network, comprising:
- at least two asynchronous hubs;
- a plurality of nodes, each of the plurality of nodes coupled to each of the at least two asynchronous hubs via a medium; and
- wherein each of the at least two asynchronous hubs arbitrates between two nodes of the plurality of nodes that claim access to at least two media by granting access to a higher priority one of the two competing nodes of the plurality of nodes, wherein each of the at least two asynchronous hubs implements a different, complementary priority scheme such that one of the at least two hubs grants access to the node with a higher port number and another of the at least two hubs grants access to the node with a lower port number.

* * * * *

UNITED STATES PATENT AND TRADEMARK OFFICE
CERTIFICATE OF CORRECTION

PATENT NO. : 7,630,390 B2  Page 1 of 1
APPLICATION NO. : 10/993911
DATED : December 8, 2009
INVENTOR(S) : Zumsteg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1279 days.

Signed and Sealed this

Second Day of November, 2010

David J. Kappos
*Director of the United States Patent and Trademark Office*